United States Patent [19]

Perla et al.

[11] 4,127,372
[45] Nov. 28, 1978

[54] APPARATUS FOR MANUFACTURING MARBLED AND STRIPED SOAP

[75] Inventors: Giulio Perla; Alessandro D'Arcangeli, both of Rome, Italy

[73] Assignee: Colgate-Palmolive Company, New York, N.Y.

[21] Appl. No.: 668,248

[22] Filed: Mar. 18, 1976

Related U.S. Application Data

[62] Division of Ser. No. 466,690, May 3, 1974, abandoned.

[51] Int. Cl.² .............................................. B29F 3/12
[52] U.S. Cl. .............................. 425/131.1; 264/171; 264/245; 425/205; 425/376 R
[58] Field of Search ................. 425/131.1, 197, 198, 425/199, 4 C, 205, 192, 376 R; 264/75, 245, 171

[56] References Cited

U.S. PATENT DOCUMENTS

| 3,391,051 | 7/1968 | Ehrenfreund et al. | 425/4 C X |
| 3,488,669 | 1/1970 | Goodrum et al. | 425/192 |
| 3,658,973 | 4/1972 | Aykanian | 425/4 C X |
| 3,679,336 | 7/1972 | Bagley et al. | 425/131.1 X |
| 3,890,419 | 6/1975 | Kaniecki | 425/224 X |

Primary Examiner—Francis S. Husar
Assistant Examiner—Mark Rosenbaum
Attorney, Agent, or Firm—Strauch, Nolan, Neale, Nies & Kurz

[57] ABSTRACT

Apparatus for making striped or variegated soap wherein soap of one predominant color is plodded and extruded as a continuous billet of predetermined cross section with fluid of another predominant color being injected into the soap stream through pressure responsive valves in downstream oriented fixed nozzles after it leaves the plodder worm and prior to extrusion.

4 Claims, 8 Drawing Figures

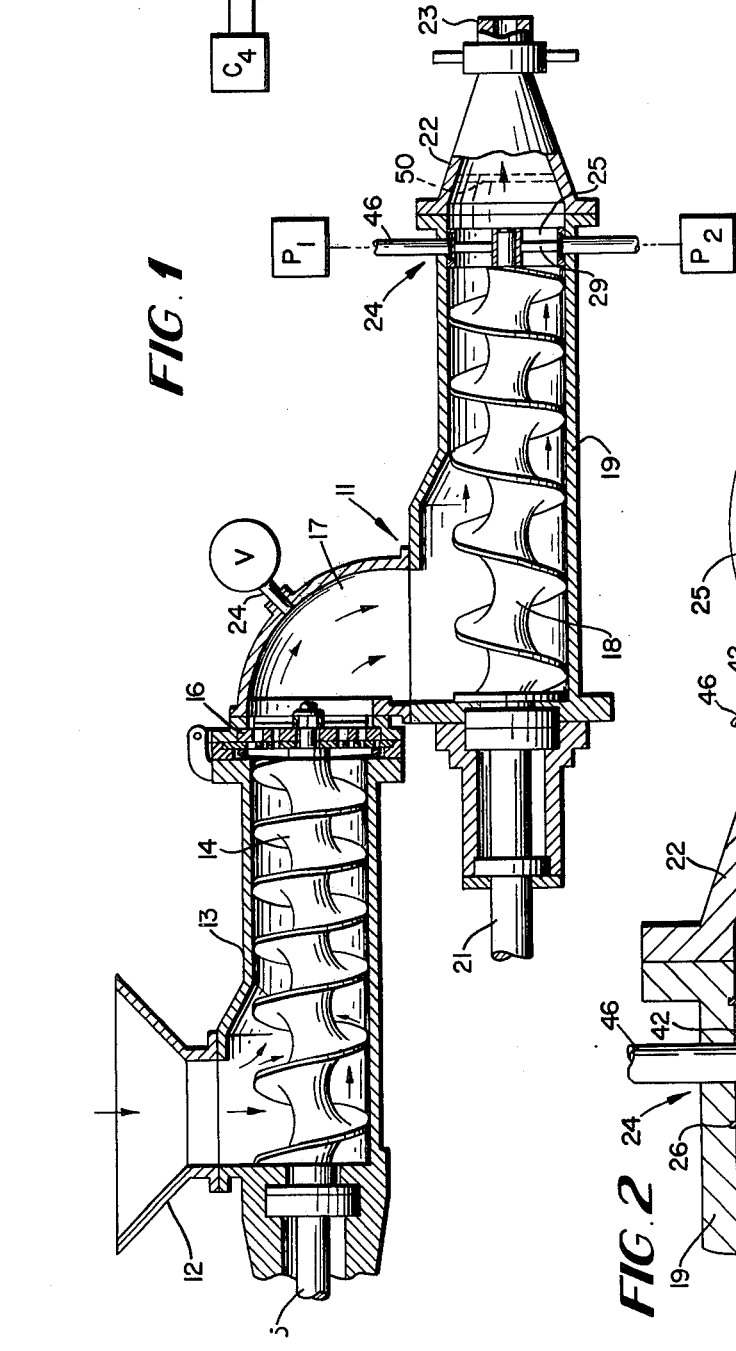

APPARATUS FOR MANUFACTURING MARBLED AND STRIPED SOAP

This is a division, of application Ser. No. 466,690, filed May 3, 1974, now abandoned.

This invention relates to an apparatus for making plodded soap having a striped or variegated appearance and is particularly concerned with a special apparatus wherein color is controllably injected directly into soap during plodding.

The term soap as used herein includes soaps, detergents, combinations thereof and like cleaning agents.

It has been proposed to produce variegated soap by introducing colored liquids into soap during working or plodding, as in U.S. Pat. No. 3,485,905 to Compa et al. In that patent soap of one color being plodded is given a variegated appearance by introducing a contrasting colored liquid into a dual plodder assembly in the region where soap filaments from a first plodder are being conveyed into a second plodder for compacting and compression prior to extrusion.

It has further been proposed to produce variegated soap by injecting colored liquid into the soap mass being worked by the plodder worm, as disclosed in Canadian Pat. No. 892,530. It has also been proposed to produce variegated soap by injecting a colored liquid through the end of a rotating plodder worm into the soap mass compacted by worm, as disclosed in Patterson U.S. Pat. No. 3,676,538.

The extruded billets of soap made according to these patents exhibit generally longitudinally extending striations of the contrasting color. While this provides a very pleasing marbled effect, there is no precise control of the disposition of the striations or the patterns formed thereby, and it is a major advantage of the present invention that such control may be provided one of the advantages of such control being the ability to make definitely striped soap.

An advantage of the invention is that soap being compressed and compacted in a plodder has injected thereinto in a predetermined pattern between the end of the worm and the plodder cone a color dye liquid for creating predictable stripes in the extruded billet. It has been proposed as in Kelley et al U.S. Pat. Nos. 3,268,970 and 3,398,219 to make striped plodded soap but these patents require the union of two differently colored preformed soap streams.

Another advantage of the invention is a novel soap plodder arrangement having a colored solution injection system disposed across the path of soap flow wherein the colored solution is directly discharged downstream into the moving soap stream by nozzle members that are mounted on fixed supports extending transversely across the soap stream.

A further advantage of the invention is a novel colored solution injection system in a soap plodder wherein a plurality of relatively stationary colored solution injection nozzle member supports extend transversely, preferably substantially radially, of the soap stream and mount nozzle members disposed for introducing the color solution into the soap flowing past them. While the U.S. Patent to Kaniecki No. 3,890,419 issued June 17, 1975 discloses apparatus of this general type, the invention comprises novel apparatus for controlling soap flow while introducing the coloring material. An attendant feature is the provision of unidirectional valves at these openings for preventing back flow of soap into the nozzle members.

Another advantage of the invention is a worm type plodder arrangement having a color solution injection system disposed in the plodder chamber between the discharge end of the worm and the cone at the extrusion end of the plodder.

An advantage of the invention is the provision of a color solution injection device in a worm plodder wherein the device comprises a plurality of streamlined nozzle member supports extending or radiating substantially radially across the soap stream and having a plurality of downstream discharging nozzle openings.

It is another advantage of the invention that a plurality of different color solutions may at the same time be injected into soap being plodded for a multi-color striped or variegated effect. This may be accomplished by separate nozzle member supports extending transversely of the soap stream and each connected to a source of a different color solution.

An advantage of the invention is the provision of novel apparatus for making striped or variegated soap wherein liquid color solution is discharged into a soap stream at predetermined fixed locations across the stream. Attendant to this advantage is the discharge of the color solution into the soap stream at a somewhat higher pressure than the soap stream and in the direction of flow of the stream.

A further advantage of the invention is the provision of novel apparatus for making striped or variegated soap wherein color solution is discharged directly into the soap stream in a plodder in a predetermined pattern from a stationary nozzle arrangement extending over the cross section of the stream leaving the plodder worm.

Further advantages will become apparent in connection with the following detailed description taken with the appended claims and the attached drawings.

BRIEF DESCRIPTION OF DRAWINGS

FIG. 1 is a side elevation mainly in section showing extrusion apparatus incorporating the invention according to a preferred embodiment:

FIG. 2 is an enlarged fragmentary elevation elevation mainly in section showing the colored liquid injection station;

FIG. 3 is an end view of the colored liquid injection device;

FIG. 4 is a section substantially on line 4—4 of FIG. 2 showing the shape of an injection nozzle support;

FIG. 5 is a fragmentary illustrative view partly in section showing a unidirectional pressure responsive nozzle opening valve;

FIGS. 6 and 7 are side and end elevations showing the extruded billet of striped soap; and FIG. 8 is a diagrammatic view illustrating simultaneous injection of different colors into the soap.

PREFERRED EMBODIMENTS

FIG. 1 shows a plodder apparatus 11 wherein milled soap is introduced through a hopper 12 of a first plodder 13 adjacent one end of a worm 14 rotated by means (not shown) coupled to shaft 15. The soap is compacted and compressed by the worm during passage through plodder 13 and forced through a fixed foraminous plate or screen assembly 16 that subdivides the extruded soap into pellets or filaments which drop through space 17 opening into one end of the worm 18 of a second plodder 19. Worm 18 has a shaft 21 driven by means (not shown) for continuously rotating the worm.

The soap is compacted and compressed by worm 18 as it is forced toward the discharge end of plodder 19 where it enters a reducing diameter conical extension 22 of the plodder casing and is extruded through nozzle 23 that imparts a predetermined cross-sectional shape (for example rectangular) to the billet of soap being extruded therethrough.

A source of vacuum indicated at V in FIG. 1 is connected by conduit 24 into space 17 and therefore into the interior of the plodder apparatus whereby the soap is worked by the worms 14 and 18 in vacuum chambers within the plodder.

The foregoing apparatus to the extent described is more or less conventional and may for example be similar to that disclosed in the Compa et al patent wherein the production of variegated soap in a dual plodder is obtained by randomly introducing a colored liquid into the soap before being worked in the second plodder.

The present invention differs essentially over the Compa et al arrangement, and over the rotating colored liquid discharge system of Patterson, in that colored liquid may be injected into the soap during plodding under controlled distribution conditions, and this is effected at a stationary colored liquid injection station 24 which is preferably located in the plodder chamber beyond the discharge end of worm 18 in the path of the compressed and compacted soap stream before it enters the final compression cone 22.

The colored liquid injection device at 24 comprises an annular member 25 peripherally seated and axially fixed as by snap rings 26 within the constant diameter chamber of plodder 19. Preferably member 25 has a central hollow hub section 27 rotatably receiving stub shaft 28 on the end of worm 18, and a plurality of apertured nozzle supports 29 radially extending from the hub to the annular member 25.

As shown in FIG. 4, each nozzle support 29 is generally triangular in cross section and streamlined to facilitate soap flow past it, and comprises a rear wall 31 and converging side walls 32 and 33 that intersect a short front wall 34. Walls 31–33 are exteriorly smoothly curved and convex. The corners 35 and 36 between the side and rear walls are smoothly rounded, as are the corners 37 and 38 between the side and front walls.

Each nozzle support 29 is formed with an internal longitudinal passage 41 that at its outer end opens into continuous annular passage 42 in member 25, and the front wall of each nozzle support which is only about one half as wide as the rear wall is formed along its length with a series of nozzle openings 43.

These nozzle openings 43 are thus arranged radially with respect to the path of flow of the soap stream that leaves the worm, and they all open axially of that path downstream or in the direction of flow of the soap.

At least one source of colored liquid indicated at $P_1$ is connected by a conduit 46 to the annular passage 42. This source delivers liquid of a desired color under a predetermined pressure into the passage 42 which distributes it to all of the nozzle supports 29 that in turn discharge it through openings 43 in the direction of the dotted line arrow in FIG. 4. With further reference to FIG. 4 the path of flow of the soap past the nozzle supports is indicated by the solid line arrows, and it will be noted that the streamline configuration of the nozzle supports aids in convergent smooth flow of the soap stream around the side surfaces of the nozzle supports to encompass and contain the discharging colored liquid.

It is preferable in some embodiments, as shown in FIG. 5, to provide unidirectional pressure responsive valves 47 at each opening 43. One form of such check valve may take the form of a ball 48 biased toward closed nozzle condition on a seat 49 by a light compression spring 50 seated on two or more projecting radial lugs 51. The strength of spring 50 is such that it permits the check valve to quickly open under pressure of the colored liquid, but closes the check valve when there is no or very low colored liquid pressure. This is important as will appear at the beginning stages of operation in that it prevents soap under worm pressure from being forced through the injection nozzle openings.

A second source of colored liquid $P_2$ may be connected to discharge into annular passage 42 diametrically opposite the first source. This provides for more uniform pressure colored liquid at all of the nozzle openings.

The invention therefore provides for direct continuous discharge of liquid of a selected color within and controllably distributed in a fixed pattern throughout the transverse cross section of the soap being plodded. Colored liquids that are insoluble in the soap are preferred for more definite coloring of stripes. The color will appear as well defined bands or stripes 44 extending longitudinally of the extruding billet as indicated in FIGS. 6 and 7. The striped appearance will depend specifically upon the number and arrangement of the nozzle supports 29, and on the size, number and arrangement of the nozzle openings 43 in each support. Many variations for creating different striped patterns in the billet are possible.

Where variegated soap is desired, stationary frames or baffles may be disposed within the cone 22 as indicated by the dotted lines at 50 in FIG. 1, and this will distribute the color less definitely and more randomly within the billet to provide a marbled effect.

The colored liquid is injected under sufficient pump pressure to enter the soap stream which has been worked in a vacuum. This pressure is normally at least slightly higher than that of the soap stream and can be varied to suit operational conditions such as the degree of vacuum in the plodder chamber, and to regulate the amount of color being discharged into the soap.

The extruded billet will externally present a generally longitudinally striped appearance. A bar severed from the billet may be pressed laterally normal to the grain to retain this definite striped appearance, or it may be pressed longitudinally parallel to the grain to develop a characteristic transverse pattern or design like a flower.

It is also within the scope of the invention as shown diagrammatically in FIG. 7 to inject more than one color at a time into the soap stream. The nozzle supports 29 are essentially as above described, but each is connected to an isolated section of the annular passage of member 25, each section being supplied with a different color liquid from sources $C_1$, $C_2$, $C_3$ and $C_4$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for making striped or variegated soap comprising a plodder containing a rotatable worm for working soap of one predominant color to form a continuous plastic stream and extruding said stream as a solid billet of predetermined cross section, means for injecting colored liquid into the soap stream prior to extrusion comprising an annular hollow member surrounding the path of the soap stream and a plurality of hollow members mounted on and extending substantially radially inwardly from said annular member across the stream downstream of the end of said worm, means whereby said annular member is connected to at least one source of liquid colored differently from said predominant color, and means defining a series of downstream facing discharge nozzle openings in each of said hollow members, each of said hollow members being generally triangular with smooth rounded corners in cross section with the apex facing downstream and formed with said nozzle openings, and the sides of said hollow members smoothly symmetrically converging toward the apex so that the soap in said stream parted by said members during passage flows along said sides to rejoin while directly encompassing the colored liquid emerging from said nozzle openings.

2. The apparatus of claim 1, wherein said hollow members are fixed at their inner ends on a hub, and said worm has an end rotatably mounted in said hub.

3. Apparatus as defined in claim 1, wherein unidirectional pressure responsive colored liquid flow control valves are provided in each nozzle opening, said valves opening only in response to a predetermined pressure of said colored liquid.

4. Apparatus as defined in claim 1, wherein said hollow annular member is interiorly separated into a plurality of discrete compartments each connected externally to a different colored liquid supply and internally to a different hollow member.

* * * * *